(12) United States Patent
Matsushima et al.

(10) Patent No.: US 11,876,249 B2
(45) Date of Patent: Jan. 16, 2024

(54) CONDUCTIVE MODULE

(71) Applicant: Yazaki Corporation, Tokyo (JP)

(72) Inventors: Tomohiro Matsushima, Shizuoka (JP);
Yuuta Matsunaga, Shizuoka (JP);
Hideto Masuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 98 days.

(21) Appl. No.: 17/524,119

(22) Filed: Nov. 11, 2021

(65) Prior Publication Data

US 2022/0158310 A1 May 19, 2022

(30) Foreign Application Priority Data

Nov. 16, 2020 (JP) ................. 2020-189938

(51) Int. Cl.
*H01M 50/519* (2021.01)
*H01M 50/503* (2021.01)
*H01M 10/48* (2006.01)
*H01M 50/209* (2021.01)
*H01M 10/42* (2006.01)
*H01M 50/521* (2021.01)
*H01M 50/507* (2021.01)

(52) U.S. Cl.
CPC ....... *H01M 50/519* (2021.01); *H01M 10/425* (2013.01); *H01M 10/482* (2013.01); *H01M 10/486* (2013.01); *H01M 50/209* (2021.01); *H01M 50/503* (2021.01); *H01M 50/507* (2021.01); *H01M 50/521* (2021.01); *H01M 2220/10* (2013.01); *H01M 2220/20* (2013.01)

(58) Field of Classification Search
None
See application file for complete search history.

(56) References Cited

U.S. PATENT DOCUMENTS

| 8,980,452 B2 | 3/2015 | Hong et al. | |
|---|---|---|---|
| 2012/0009447 A1* | 1/2012 | Ikeda | H01M 50/505 |
| | | | 429/90 |
| 2012/0141839 A1 | 6/2012 | Hong et al. | |

(Continued)

FOREIGN PATENT DOCUMENTS

| JP | 2011-060675 A | 3/2011 |
|---|---|---|
| JP | 2014-022256 A | 2/2014 |

(Continued)

*Primary Examiner* — Ula C Ruddock
*Assistant Examiner* — Mary Grace Byram
(74) *Attorney, Agent, or Firm* — Banner & Witcoff, Ltd.

(57) ABSTRACT

A conductive module includes: a conductive component as a flat flexible printed circuit substrate that electrically connects electric conductors to a plurality of battery cells; a thermistor that is placed on as electrical connection part of a bifurcating body of the conductive component and detects the temperature of a battery cell as a temperature detection target; and a housing that houses or/and holds the conductive component. The bifurcated body includes a coupling part that couples the electrical connection part to a main body. The electrical connection part is a part to which heat of an outer wall surface of the battery cell is directly or indirectly transferred from a surface on a side opposite to a placement surface on which the thermistor is placed.

3 Claims, 8 Drawing Sheets

(56) References Cited

U.S. PATENT DOCUMENTS

| | | | |
|---|---|---|---|
| 2013/0108904 A1* | 5/2013 | Okabayashi | H01M 10/486 |
| | | | 374/45 |
| 2015/0125727 A1 | 5/2015 | Lui et al. | |
| 2016/0141735 A1* | 5/2016 | Motohashi | H01M 10/6554 |
| | | | 429/120 |
| 2017/0194771 A1 | 7/2017 | Aoki | |
| 2019/0020012 A1* | 1/2019 | Ju | G01R 31/36 |
| 2020/0020916 A1* | 1/2020 | Takamatsu | H01M 50/507 |

FOREIGN PATENT DOCUMENTS

| | | |
|---|---|---|
| KR | 20120059951 A | 6/2012 |
| KR | 101230226 B1 | 2/2013 |
| WO | 2020054305 A1 | 3/2020 |

* cited by examiner

CONDUCTIVE MODULE

CROSS-REFERENCE TO RELATED APPLICATION(S)

The present application claims priority to and incorporates by reference the entire contents of Japanese Patent Application No. 2020-189938 filed in Japan on Nov. 16, 2020.

BACKGROUND OF THE INVENTION

1. Field of the Invention

The present invention relates to a conductive module.

2. Description of the Related Art

A conventional vehicle (such as an electric vehicle or a hybrid electric vehicle) employing a rotary machine as a drive source includes a battery module configured to supply power to the rotary machine, and a conductive module that is electrically connected to a plurality of battery cells included in the battery module. When electrically connected to the plurality of battery cells, the conductive module electrically connects electrode terminals of adjacent battery cells to each other, and electrically connects the battery cells to a battery monitoring unit (device for monitoring battery states of the battery cells). For example, the conductive module includes a thermistor capable of detecting the temperature of a battery cell and thereby causes the battery monitoring unit that received a detection signal transferred from the thermistor to monitor temperature change at the battery cell. Conductive modules of this kind are disclosed in, for example, Japanese Patent Application Laid-open. No. 2011-60675 and Japanese Patent Application Laid-open No. 2014-22256.

A detection signal from a thermistor is transferred to a battery monitoring unit through, for example, a conductive component such as an electrical line or a flexible printed circuit substrate (what is called an FPC). Thus, in the conductive module, at least a peripheral part of the conductive component around the thermistor is disposed close to a battery cell side together with the thermistor. Accordingly, in the conductive module, when another component that is not a component of the conductive module exists around the thermistor, it is desired to avoid interference of the conductive component with the other component around the thermistor in order to maintain quality of the conductive component and reduce durability decrease thereof.

SUMMARY OF THE INVENTION

Thus, the present invention is intended to provide a conductive module that can prevent interference between a conductive component and another component around a thermistor.

In order to achieve the above mentioned object, a conductive module according to one aspect of the present invention includes: a conductive component that includes a flat laminated body of a plurality of flexible electric conductors and a flexible electric insulator and electrically connects the electric conductors to a plurality of battery cells arranged in an array direction; a thermistor that is provided for a temperature detection target among all battery cells in a state where the thermistor is placed on an electrical connection part of a bifurcated body that is bifurcated from a main body of the conductive component, and is configured to detect the temperature of a battery cell as the temperature detection target; and a housing that houses or/and holds the conductive component, wherein the conductive component is a flexible printed circuit substrate, the bifurcated body is a part in which the electric conductor for the thermistor is bifurcated together with the electric insulator from the main body including the electric conductors, and includes the electrical connection part and a coupling part that couples the electrical connection part to the main body, the electrical connection part is a part that connects the thermistor physically and electrically to the electric conductor for the thermistor and allows heat of an outer wall surface of the battery cell to be directly or indirectly transferred from a surface on a side opposite to a placement surface on which the thermistor is placed to the electrical connection part, the housing includes a path guiding part that guides the coupling part, bifurcated from the main body, to the electrical connection part without causing the coupling part to interfere with another component that is different from a component of the conductive module on the outer wall surface side, and the path guiding part is a cutout part provided to the housing.

According to another aspect of the present invention, in the conductive module, it is possible to further include that a heat transfer member that is provided on the placement surface side of the electrical connection part and transfers heat of the electrical connection part to the thermistor; and a pressing member that presses the electrical connection part toward the outer wall surface through the heat transfer member, wherein the pressing member includes a pressing part that exerts pressing force toward the electrical connection part to the heat transfer member, and a first arm and a second arm that are each a cantilever protruded in arm shapes from the pressing part and are elastically deformable, the housing includes a first lock part that locks a free end of the first arm, and a second lock part that locks a free end of the second arm, the first lock part and the second lock part are shaped as parts that elastically deform the first arm and the second arm each having an free end that is locked, while the pressing part is in contact with the heat transfer member, exert force in accordance with snapping force due to the elastic deformation from the respective fixed ends of the first arm and the second arm to the pressing part, and exert the pressing force from the pressing part to the heat transfer member based on force in accordance with the snapping force, the coupling part is routed between the second arm and the outer wall surface, and the second lock part is provided on each of one side and the other side with the path guiding part as the cutout part sandwiched therebetween.

According to still another aspect of the present invention, in the conductive module, it is possible to configure that the heat transfer member includes: a first heat transfer member that is formed in an annular shape, is placed on the electrical connection part, disposes the thermistor in an internal space inside of the annular shape, and is physically connected to the electrical connection part, and a second heat transfer member that fills the internal space and transfers heat of the first heat transfer member and the electrical connection part to the thermistor, the coupling part includes, at an end part on the electrical connection part side, a bent part that is bent in an arc shape to stand up toward a side opposite to the outer wall surface, and the first heat transfer member includes, at least at a part facing a bending inner side of the bent part, an arc chamfered part that is shaped in an arc shape.

The above and other objects, features, advantages and technical and industrial significance of this invention will be better understood by reading the following detailed descrip-

DETAILED DESCRIPTION OF THE PREFERRED EMBODIMENTS

An embodiment of a conductive module according to the present invention will be described below in detail with reference to the accompanying drawings. The present invention is not limited by the present embodiment.

Embodiment

One embodiment of the conductive module according to the present invention will be described below with reference to FIGS. 1 to 8.

In FIGS. 1 to 6, a reference sign 1 denotes the conductive module of the present embodiment. The conductive module 1 is assembled to a battery module BM (FIGS. 1 and 7) and included is a battery pack HP together with the battery module BM. The battery pack HP is mounted on a vehicle (such as an electric vehicle or a hybrid electric vehicle) employing a rotary machine as a drive source and is used for, for example, power supply to the rotary machine. Only part of the conductive module 1 is illustrated.

Figure 1:
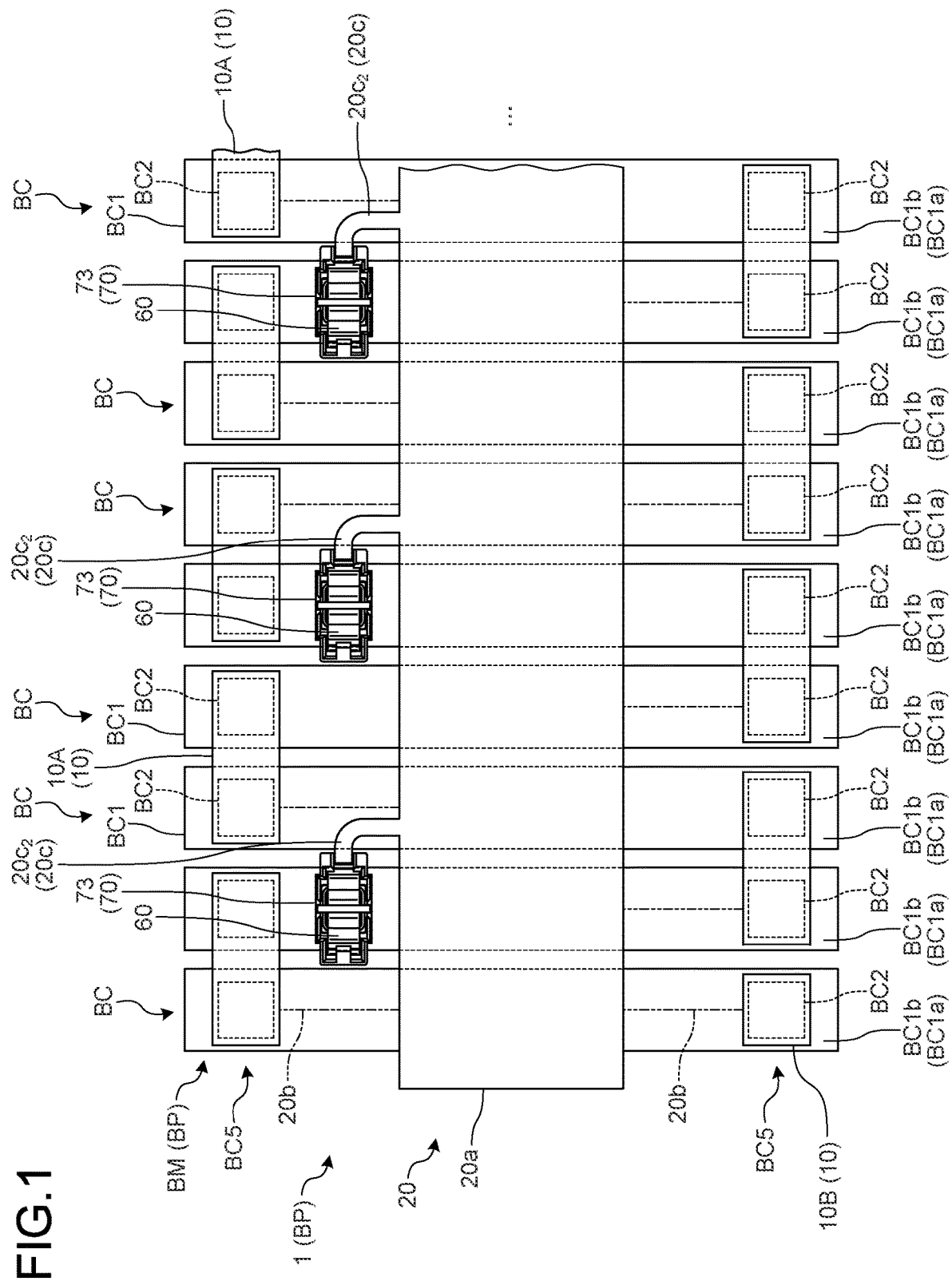
FIG. 1 is a schematic diagram for description of a conductive module according to an embodiment.
Figure 7:
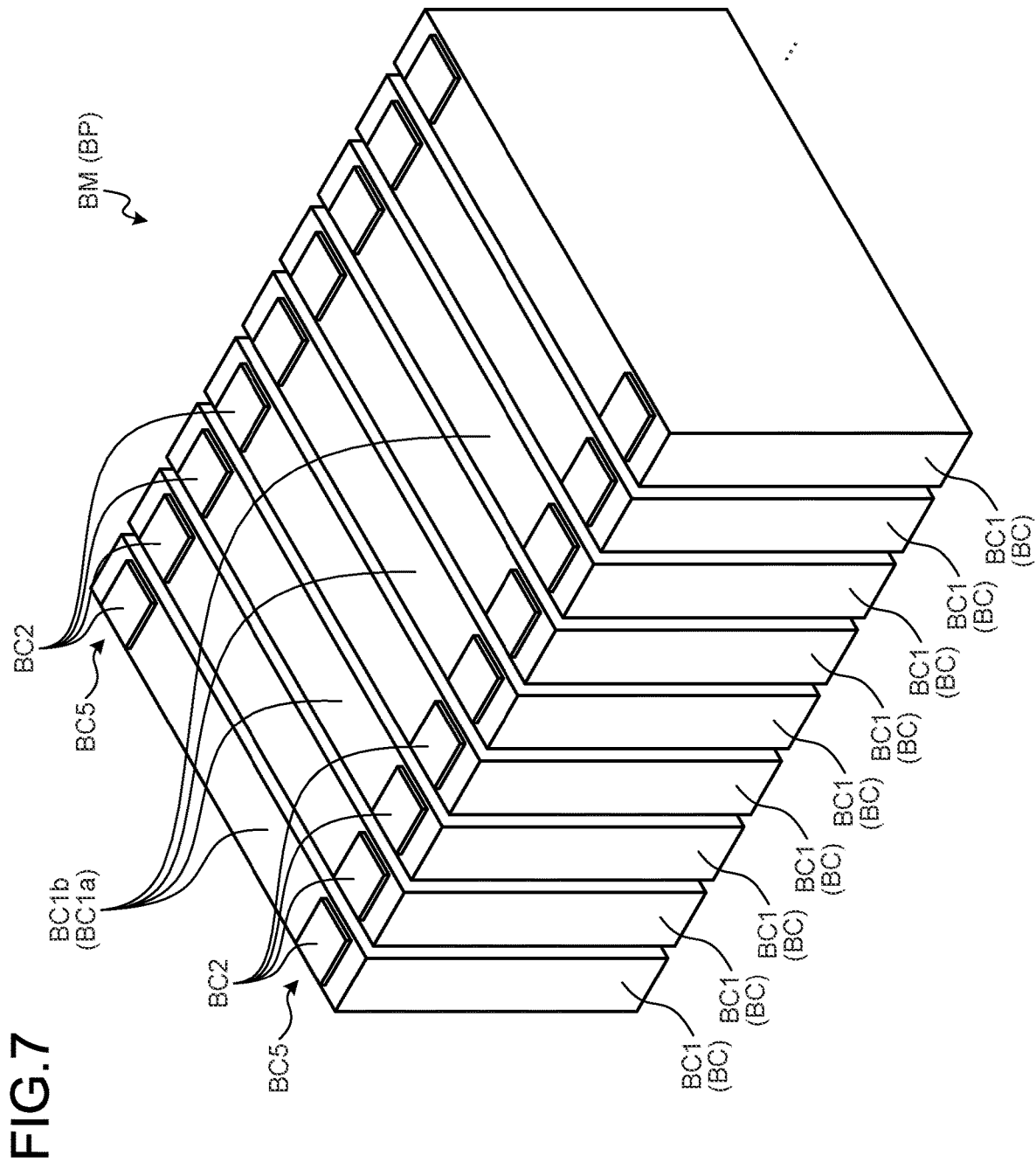
FIG. 7 is a schematic diagram for description of a battery module.

The battery module BM includes a plurality of battery cells BC arranged Ln an array direction. Each of the battery cells BC includes a cell body BC1 and two electrode terminals BC2 (FIGS. 1 and 7). Each of the electrode terminals BC2 is externally exposed and provided at any place on the cell body BC1. One of the electrode terminals BC2 is a positive electrode, and the other is a negative electrode. In each of the battery cells BC, a housing BC1a of the cell body BC1 is shaped in a cuboidal shape. The electrode terminals BC2 are disposed for one (outer wall surface BC1b) of six outer wall surfaces of the housing BC1a so as to form an interval in a direction orthogonal to the array direction of the battery cells BC. Each of the electrode terminals BC2 has a plate shape having one plane parallel to the outer wall surface BC1b, and the one plane is physically and electrically connected to a terminal connection component 10 to be described later.

The battery cells BC are disposed side by side in one direction so that the electrode terminals BC2 on one side are arranged in line and the electrode terminals BC2 on the other side are arranged in line. Accordingly, in the battery module BM, electrode terminal groups BC5 each including a plurality of the electrode terminals BC2 arranged in line are provided at two places (FIGS. 1 and 7). Hereinafter, an "array direction" is the array direction of the battery cells BC or the array direction of the electrode terminals BC2 of each of the electrode terminal groups BC5, unless otherwise stated.

In the battery module BM, for each of the electrode terminal groups BC5, each of the electrode terminals BC2 are electrically connected to one another in predetermined combination through a terminal connection component, so that the battery cells BC are coupled to each other in series or parallel. In the battery module BM described herein, in each of the electrode terminal groups BC5, electrode terminals BC2 adjacent to each other in the array direction among the electrode terminals BC2 are electrically connected to each other through a terminal connection component 10 to be described later, so that the battery cells BC are coupled in series. In the battery module BM described herein, there are two electrode terminals BC2 that are not coupled through a terminal connection component 10. One of the two electrode terminals BC2 serves as a total positive electrode, and the other as a total negative electrode. In the battery module BM, the total positive electrode and the total negative electrode may be separately disposed on the respective electrode terminal groups BC5 or both may be disposed on one electrode terminal Group BC5.

The conductive module 1 is assembled to the battery module BM thus configured and is electrically connected to each of the battery cells BC. The conductive module 1 includes components as follows.

Figure 8:
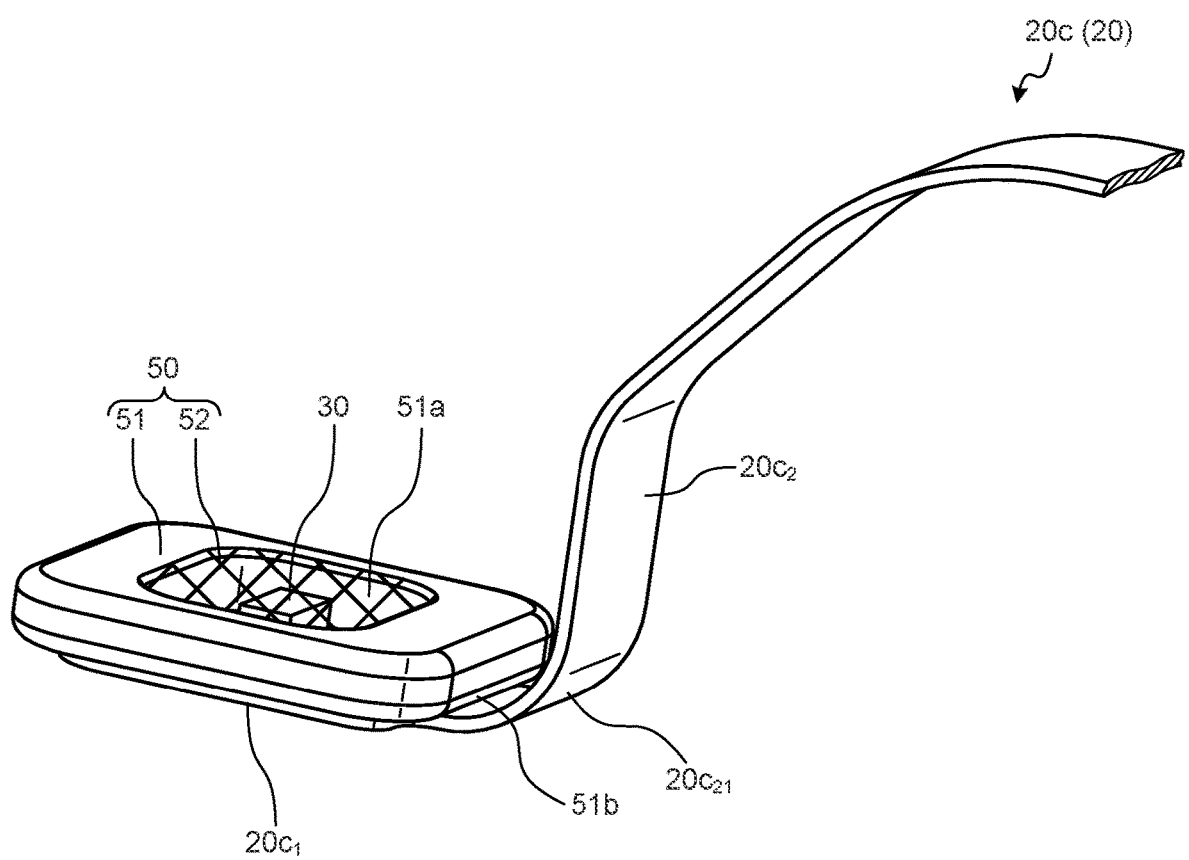
FIG. 8 is a perspective view for description of an arc chamfered part of a first heat transfer member.

The conductive module 1 includes the terminal connection components 10 that are connection components physically and electrically connected to the electrode terminals BC2 of each of the battery cells BC and are provided at least for respective combinations of adjacent two electrode terminals BC2 among the electrode terminals BC2 arranged in the array direction (FIG. 1). The conductive module 1 further includes a conductive component 20 that includes a flat laminated body of a plurality of flexible electric conductors 21 and a flexible electric insulator 22 and electrically connects the electric conductors 21 to the battery cells BC arranged in the array direction (FIGS. 1 to 6 and 8). The conductive module 1 further includes a thermistor 30 that is provided for a temperature detection target among all battery cells BC and is configured to detect the temperature of a battery cell BC as the temperature detection target (FIGS. 5, 6, and 8). The thermistor 30 of a chip type is used in the conductive module 1.

Terminal connection components 10 are provided for each of the electrode terminal groups BC5. As the terminal connection components 10, first terminal connection components 10A each electrically connecting electrode terminals BC2 adjacent to each other in the array direction among the electrode terminals BC2 of the electrode terminal group BC5, and second terminal connection components 10B for the total electrodes of the battery module BM (FIG. 1) are provided. One of the second terminal connection components 10B is electrically connected to the electrode terminal BC2 as the total positive electrode, and the other is electrically connected to the electrode terminal BC2 as the total negative electrode.

The terminal connection component 10 (10A and 10B) is formed of a conductive material such as metal. The terminal connection component 10 is what is called a bus bar formed of a metal plate as a base material and shaped in a substantially rectangular flat plate shape (FIG. 1). The terminal connection component 10 is physically and electrically connected to the corresponding electrode terminal BC2 by being welded (such as laser welding) to one plane of the electrode terminal BC2. For example, the first terminal connection component 10A is welded to each of the electrode terminals BC2 adjacent to each other in the array direction. By contrast, the second terminal connection component 10B is welded to one electrode terminal BC2 to be connected.

In the conductive component 20, the electric conductors 21 are covered by the electric insulator 22, and each of the electric conductors 21 is partially exposed from the electric insulator 22 so as to be electrically connected to the terminal connection component 10 or the thermistor 30. In the conductive component 20, a circuit pattern is shaped with the electric conductors 21. The conductive component 20 is a flexible printed circuit substrate (what is called a FPC).

The conductive component 20 includes a main body 20a that is shaped in a rectangular sheet shape and is provided with the electric conductors 21 (FIG. 1). The main body 20a includes an electric conductor 21 for a terminal connection component 10, which is used for electrical connection to a terminal connection component 10, and an electric conductor 21 for a thermistor 30, which is used for electrical connection to the thermistor 30. In the main body 20a, the electric conductor 21 for a terminal connection component 10 is provided for each of a plurality of the terminal connection components 10. In the main body 20a, since the conductive module 1 includes a plurality of the thermistors 30, the electric conductor 21 for a thermistor 30 is provided for each of the thermistors 30.

The main body 20a is shaped as a part that includes electric conductors 21 for terminal connection components 10 of the respective electrode terminal groups BCC. However, the conductive component 20 may include one main body 20a for each of the electrode terminal groups BC5. In this case, a bifurcating body 20c to be described later is bifurcated from at least one of the two main bodies 20a.

In the conductive component. 20, each of the terminal connection components 10 is electrically connected to the corresponding electric conductor 21 for a terminal connection component 10. Thus, between the main body 20a and each of the terminal connection components 10, an electrical connection member 20b is provided that electrically connects an electric conductor 21 for a terminal connection component 10 in the main body 20a to the terminal connection component 10 (FIG. 1). The electrical connection members 20b are provided for the respective terminal connection components 10. For example, each of the electrical connection members 20b is shaped as a bifurcating body in which an electric conductor 21 for a terminal connection component 10 is bifurcated together with the electric insulator 22 from the main body 20a and electrically connects the electric conductor 21 for the terminal connection component 10 in the bifurcating body to the terminal connection component 10. It should be noted That each of the electrical connection members 20b may be configured as an electric conductor (for example, an electrical line) provided in a terminal connection component 10, so as to be electrically connected to an electric conductor 21 for the terminal connection component 10 in the main body 20a.

In the conductive component 20, an electric conductor 21 for a thermistor 30 is electrically connected to each of a plurality of the thermistors 30. The conductive component 20 includes a bifurcating body 20c in which an electric conductor 21 for a thermistor 30 is bifurcated from the main body 20a together with the electric insulator 22 (FIGS. 1 to 6 and 8). The bifurcating body 20c for a thermistor 30 is provided for each of the thermistors 30.

In the battery module BM, the thermistor 30 is provided for a battery cell BC as a temperature detection target among all battery cells BC, and the temperature of the battery cell BC as the temperature detection target is detected by the thermistor 30. For example, in the battery module BM, one thermistor 30 may be disposed for every one of all battery cells BC or one thermistor 30 may be disposed for each combination of a plurality of the battery cells BC among all battery cells BC. In the latter disposition configuration, the thermistor 30 is disposed in one battery cell BC in each combination. The latter disposition configuration of thermistors 30 is employed in the battery module BM of this example. Thus, the conductive component 20 includes bifurcating bodies 20c in a number corresponding to the number of thermistors 30.

Each of the bifurcating body 20c includes an electrical connection part $20c_1$ that has a thermistor 30 placed thereon and physically and electrically connects the thermistor 30 to an electric conductor 21 for a thermistor 30 in the bifurcating body 20c (FIGS. 4 to 6 and 8). In other words, the thermistor 30 is provided for a temperature detection target among all battery cells BC in a state where the thermistor 30 is placed on the electrical connection part $20c_1$ of the bifurcating body 20c. In the electrical connection part $20c_1$, two electric conductors 21 for a thermistor 30 are partially exposed from the electric insulator 22, and the thermistor 30 is placed on exposed parts of the electric conductors 21. In the electrical connection part $20c_1$, reflow soldering is provided between the exposed part of one of the electric conductors 21 and one electrode of the thermistor 30, and between the exposed part of the other electric conductor 21 and the other electrode of the thermistor 30.

The bifurcating body 20c also includes a coupling part. $20c_2$ that couples the electrical connection part $20c_1$ to the main body 20a (FIGS. 1 to 6 and 8).

In the conductive module 1, a surface (hereinafter referred to as an "installation surface") $20c_{12}$ (FIGS. 4 and 5) opposite to a placement surface $20c_{11}$ of each of the electrical connection parts $20c_1$ on which a thermistor 30 is placed is directly or indirectly attached to the outer wall surface BC1b of the housing BC1a of the corresponding battery cell PC. With this configuration, heat of the outer wall surface BC1b of the housing BC1a of the battery cell BC is directly or indirectly transferred from the installation surface $20c_{12}$ to the electrical connection part $20c_1$. In the conductive module 1, heat is indirectly transferred from the outer wall surface BC1b of the housing BC1a of each of the battery cells BC to the corresponding electrical connection part $20c_1$. Thus, the conductive module 1 includes a heat transfer member (hereinafter referred to as a "main heat transfer member") 40 transfers the heat of the outer wall surface BC1b of the housing BC1a of the corresponding battery cell BC to the electrical connection part $20c_1$ (FIGS. 2 to 6).

The main heat transfer member 40 is formed of a material having a high thermal conductivity that enables heat transfer from the outer wall surface BC1b of the housing BC1a of the battery cell BC to the electrical connection part $20c_1$. The main heat transfer member 40 is formed of a metallic material. For example, the main heat transfer member 40 is formed of aluminum, an aluminum alloy, copper, or a copper alloy.

The main heat transfer member 40 includes a heat transfer part 41 that is interposed between the electrical connection part $20c_1$ and the outer wall surface BC1b of the housing BC1a of the battery cell BC and transfers heat from the outer wall surface BC1b to the electrical connection part $20c_1$ (FIGS. 2 to 6). The heat transfer part 41 is shaped in a flat plate shape. The heat transfer part 41 has one plane in contact with the installation surface $20c_{12}$ of the electrical connection part $20c_1$ and has the other plane in contact with the outer wall surface BC1b of the housing BC1a of the battery cell BC. The heat transfer part 41 is shaped in a rectangular flat plate shape corresponding to the rectangular electrical connection part $20c_1$.

Figure 2:
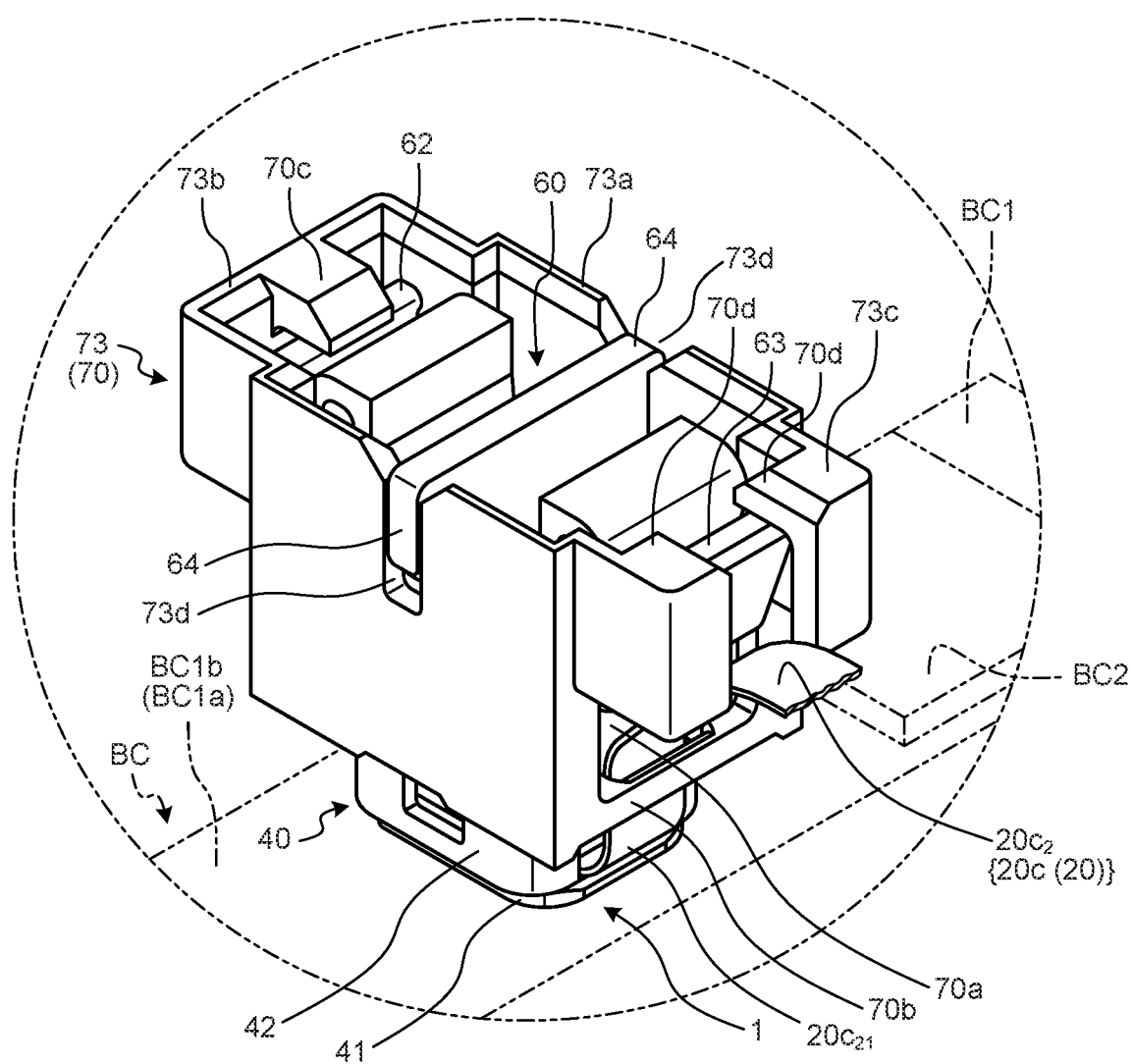
FIG. 2 is a perspective view illustrating the vicinity of a thermistor in the conductive module according to the embodiment.
Figure 3:
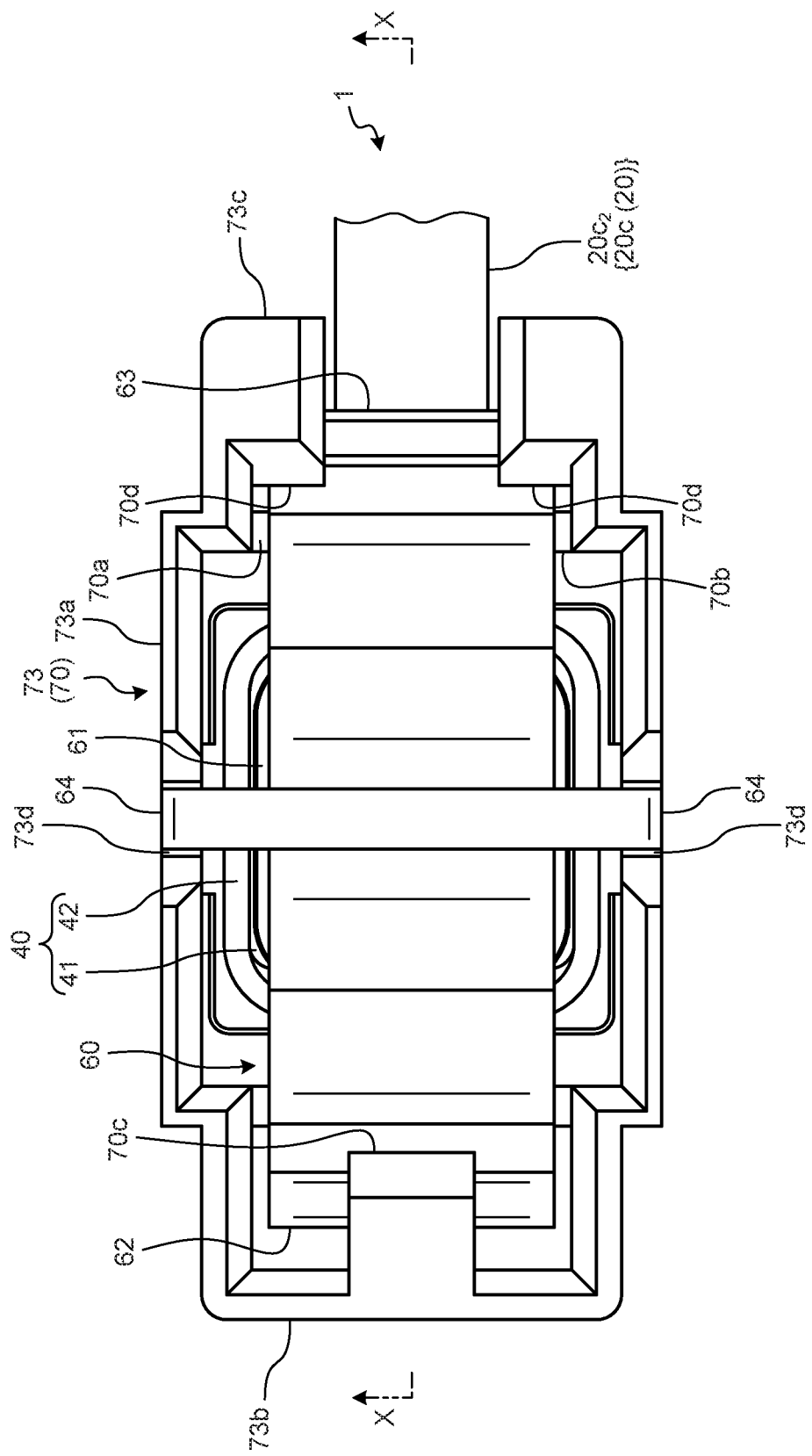
FIG. 3 is a top view illustrating the vicinity of the thermistor in the conductive module according to the embodiment.
Figure 4:
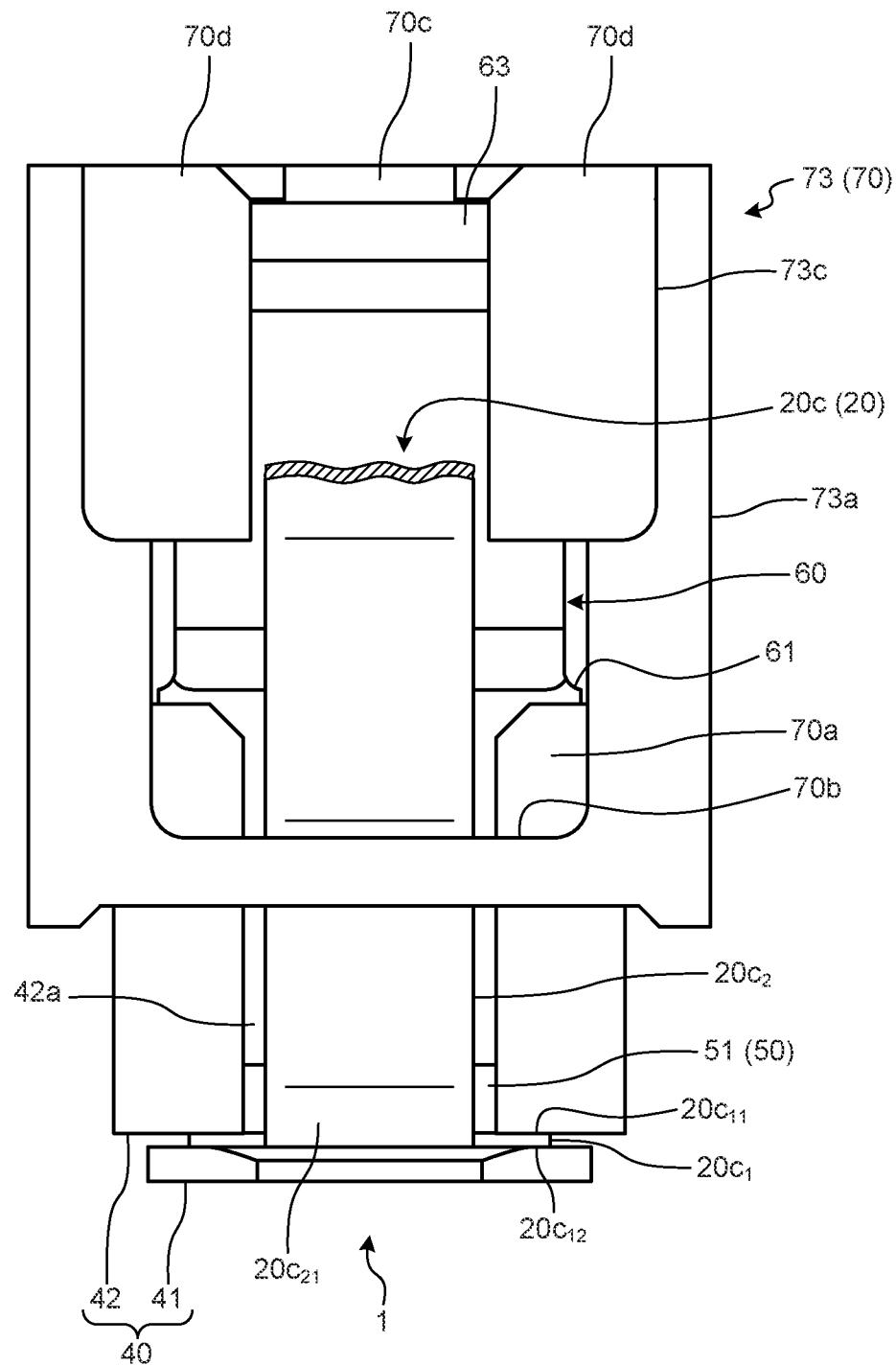
FIG. 4 is a side view illustrating the vicinity of the thermistor in the conductive module according to the embodiment.
Figure 5:
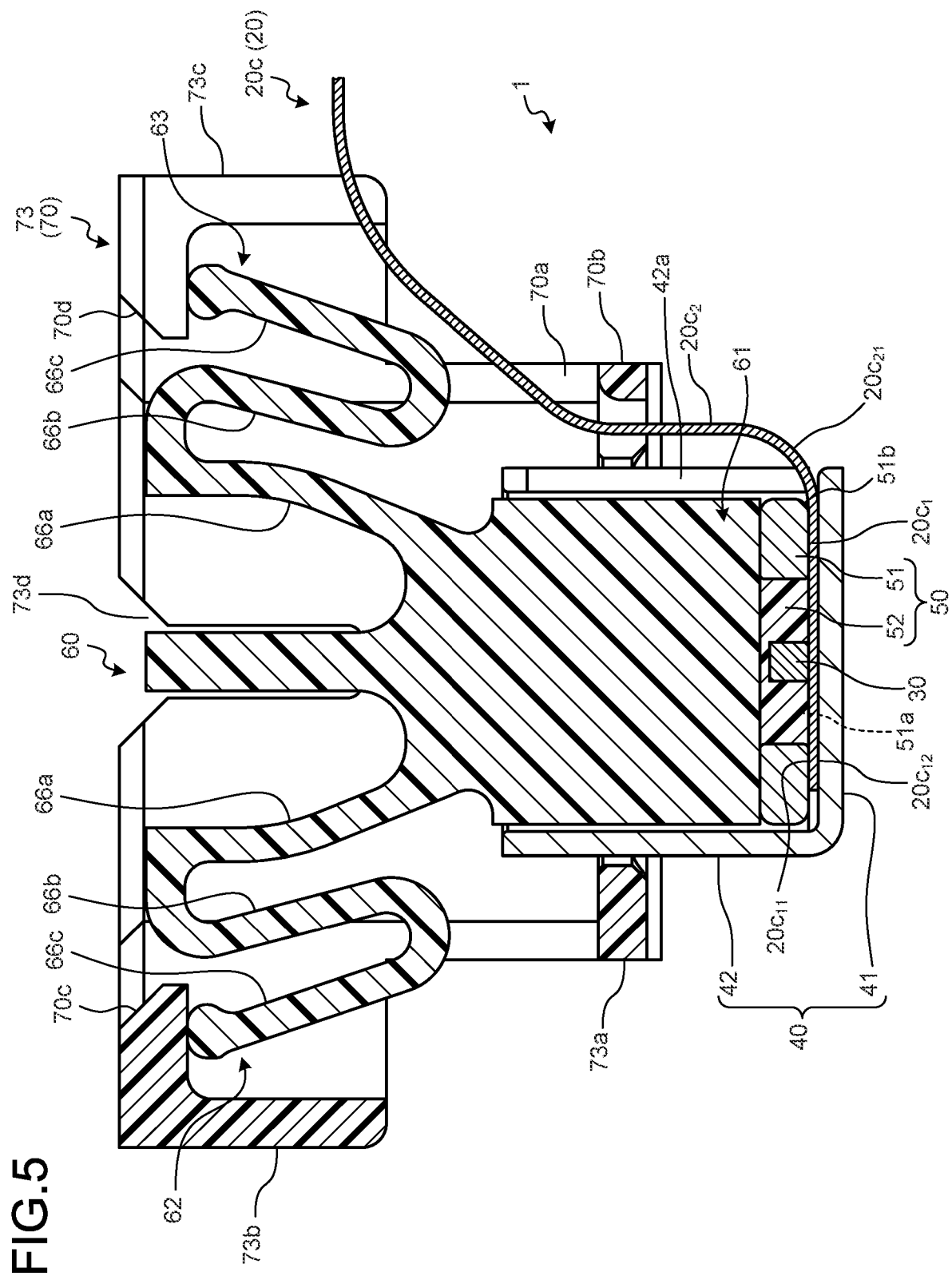
FIG. 5 is a cross-sectional view taken along line X-X in FIG. 3.
Figure 6:
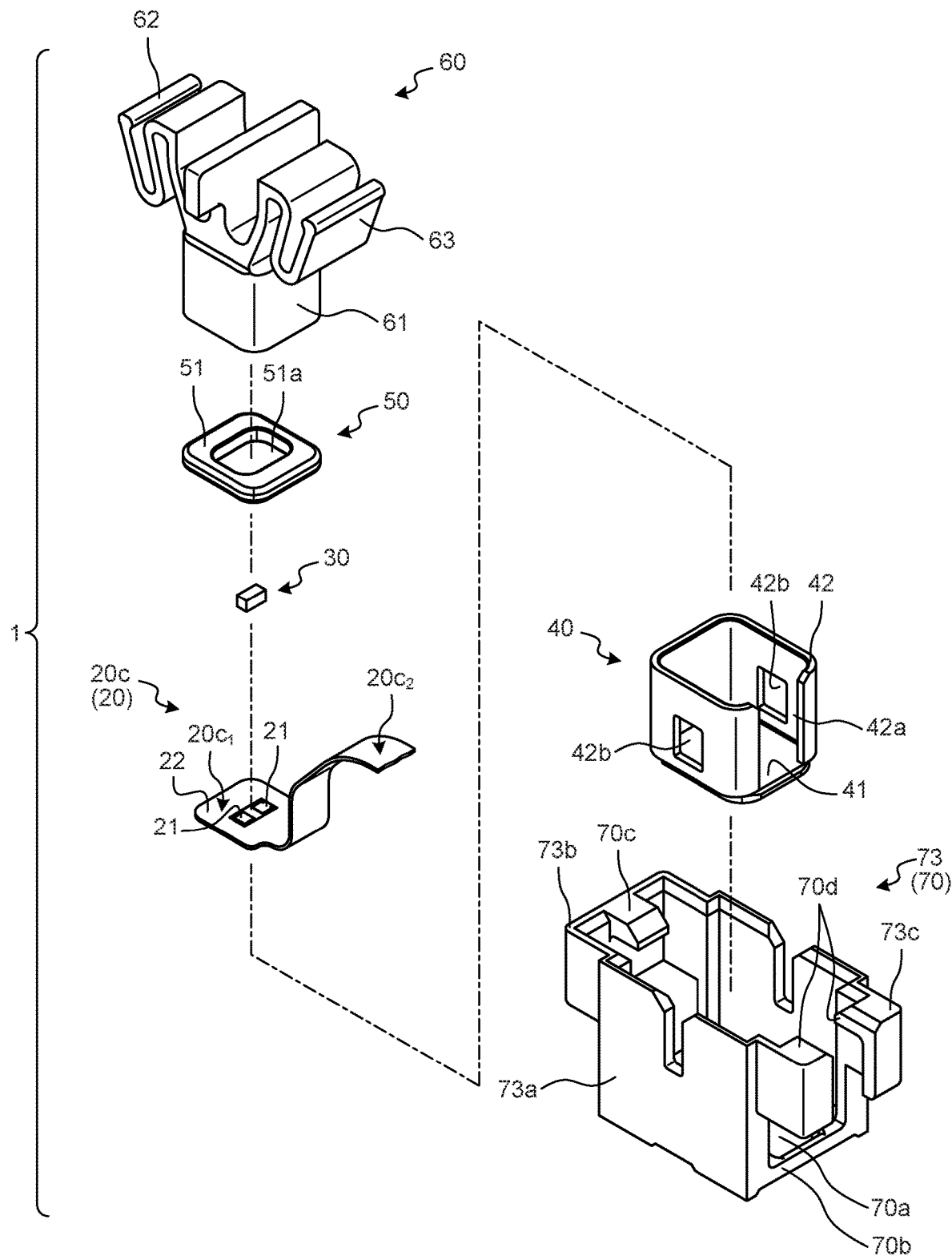
FIG. 6 is an exploded perspective view illustrating the vicinity of the thermistor is the conductive module according to the embodiment.

The main heat transfer member 40 further includes a tubular part 42 that is coupled to the heat transfer part 41 so that the heat transfer part 41 is a bottom part of the tubular part 42 (FIGS. 2 to 6). The tubular part 42 has an inner space housing an auxiliary heat transfer member 50 and a pressing part 61 of a pressing member 60 to be described later and allowing the pressing part 61 to relatively move therein in a tube axial direction. The tubular part 42 is shaped in a rectangular tubular shape and coupled to one side of the heat transfer part 41. The tubular part 42 is coupled to the heat transfer part 41 with a gap equivalent to the thickness of the electrical connection part $20c_1$ therebetween. The tubular part 42 has a slit 42a in the tube axial direction at one of four wall parts, and the coupling part $20c_2$ of the bifurcating body 20c extends to the electrical connection part $20c_1$ side through the slit 42a (FIGS. 4 to 6).

In the conductive module 1, since each of the thermistors 30 is placed on the placement surface $20c_{11}$ of an electrical connection part $20c_1$, heat transferred from the outer wall surface BC1b of the housing BC1a of the battery cell BC to the electrical connection part $20c_1$ is then transferred to the thermistor 30. To efficiently transfer heat from each of the electrical connection parts $20c_1$ to the corresponding thermistor 30, the conductive module 1 includes a heat transfer member (hereinafter referred to as an "auxiliary heat transfer member") 50 that is provided on the placement surface $20c_{11}$ side of an electrical connection part $20c_1$ and transfers the heat of the electrical connection part $20c_1$ to the corresponding thermistor 30 (FIGS. 4 to 6 and 8). The auxiliary heat transfer member 50 includes a first heat transfer member 51 and a second heat transfer member 52.

The first heat transfer member 51 is formed in an annular shape. The first heat transfer member 51 is placed on the placement surface $20c_{11}$ of the electrical connection part $20c_1$, disposes the thermistor 30 in an internal space 51a inside of the annular shape of the first heat transfer member 51, and is physically connected to the electrical connection part $20c_1$ (FIGS. 5, 6, and 8). The first heat transfer member 51 is formed of a material having a high thermal conductivity that enables heat transfer from the electrical connection part $20c_1$. The first heat transfer member 51 is formed of a metallic material as an annular plate body. For example, the first heat transfer member 51 is formed of aluminum, an aluminum alloy, copper, or a copper alloy. The first heat transfer member 51 is shaped in a rectangular annular shape corresponding to the rectangular electrical connection part $20c_1$ and placed on the placement surface $20c_{11}$ of the electrical connection part $20c_1$. Reflow soldering is provided between the first heat transfer member 51 and the electrical connection part $20c_1$.

The second heat transfer member 52 is provided to fill the internal space 51a of the first heat transfer member 51 and transfer the heat of the first heat transfer member 51 and the electrical connection part $20c_1$ to the thermistor 30 (FIGS. 5, 6, and 8). Thus, the second heat transfer member 52 is shaped as a solidified body of liquid synthesis resin material (potting agent) filling the internal space 51a of the first heat transfer member 51, the bottom part of which is the electrical connection part $20c_1$. The second heat transfer member 52 is shaped by, for example, filling the internal space 51a with transparent or semi-transparent liquid synthesis resin material and solidifying the synthesis resin material. The thermistor 30 is embedded in the second heat transfer member 52, and thus can receive the heat of the first heat transfer member 51 and the electrical connection part $20c_1$ through the second heat transfer member 52. Thus, the second heat transfer member 52 is formed of a synthesis resin material having a high thermal conductivity that enables heat transfer from the first heat transfer member 51 and the electrical connection part $20c_1$ to the thermistor 30.

The thermistor 30 potentially releases received heat to the air when its outer wall surface touches air. Thus, the second heat transfer member 52 is formed so that no space layer is interposed between the first heat transfer member 51 and the thermistor 30 to efficiently transfer the heat of the first heat transfer member 51 and the electrical connection part $20c_1$ to the thermistor 30. In addition, the second heat transfer member 52 has a function to prevent liquid such as water from contacting the thermistor 30 and the electrical connection part $20c_1$.

The second heat transfer member 52 is hatched in FIG. 8 to facilitate identification among other components in the drawing. FIG. 6 illustrates an exploded perspective view before the second heat transfer member 52 is formed, and thus the second heat transfer member 52 is omitted in the drawing.

In the conductive module 1, heat received by the main heat transfer member 40 from the outer wall surface BC1b of the housing BC1a of the battery cell BC is transferred to the thermistor 30 through the bifurcating body 20c and the auxiliary heat transfer member 50. Specifically, the main heat transfer member 40 receives, at the heat transfer part 41, the heat of the outer wall surface BC1b of the housing BC1a of the battery cell BC, passes the heat of the heat transfer part 41 to the electrical connection part $20c_1$ of the bifurcating body 20c, and then transfers the heat of the electrical connection part $20c_1$ to the thermistor 30. Accordingly, the conductive module 1 includes a first heat transfer path through which heat is transferred from the outer wall surface BC1b of the housing BC1a of the battery cell BC to the thermistor 30 through the heat transfer part 41 and the electrical connection part $20c_1$. In addition, in the conductive module 1, heat passed from the heat transfer part 41 to the electrical connection part $20c_1$ of the bifurcating body 20c is transferred to the auxiliary heat transfer member 50. Moreover, in the conductive module 1, heat is transferred from the heat transfer part 41 to the tubular part 42 and then transferred to the auxiliary heat transfer member 50 through the tubular part 42. In the auxiliary heat transfer member 50, heat transferred from the electrical connection part $20c_1$ and the tubular part 42 to the first heat transfer member 51 is transferred to the thermistor 30 through the second heat transfer member 52, and heat transferred from the electrical connection part $20c_1$ and the first heat transfer member 51 to the second heat transfer member 52 is directly transferred to the thermistor 30. Accordingly, the conductive module 1 includes a second heat transfer path through which heat is transferred from the outer wall surface BC1$b$ of the housing BC1$a$ of the battery cell BC to the thermistor 30 through the heat transfer part 41 and the auxiliary heat transfer member 50, and a third heat transfer path through which heat is transferred from the outer wall surface BC1$b$ of the housing BC1$a$ of the battery cell BC to the thermistor 30 through the heat transfer part 41, the tubular part 42, and the auxiliary heat transfer member 50. In this manner, in the conductive module 1, the main heat transfer member 40 also functions as a heat collection member, and heat can be transferred from the outer wall surface BC1$b$ of the housing BC1$a$ of the battery cell BC to the thermistor 30 through various routes, which enables highly accurate temperature measurement by the thermistor 30.

In addition, the conductive module 1 includes the pressing member 60 that presses the electrical connection part $20c_1$ toward the outer wall surface BC1$b$ of the housing BC1$a$ of the battery cell BC through the auxiliary heat transfer member 50 (FIGS. 1 to 6). The pressing member 60 includes the pressing part 61 that exerts pressing force toward the electrical connection part $20c_1$ to the auxiliary heat transfer member 50, and a first arm 62 and a second arm 63 that are each a cantilever protruded in arm shapes from the pressing part 61 and are elastically, deformable (FIGS. 2 to 6). The pressing member 60 is formed of an insulating material such as synthesis resin.

The pressing member 60 elastically deforms the first arm 62 and the second arm 63 when the pressing part 61 is made contact with the auxiliary heat transfer member 50 and the first arm 62 and the second arm 63 are locked to a housing 70 to be described later. Then, the pressing member 60 exerts force in accordance with snapping force due to the elastic deformation to the pressing part 61 through fixed end of each of the first arm 62 and the second arm 63, and exerts pressing force toward the electrical connection part $20c_1$ from the pressing part 61 to the auxiliary heat transfer member 50 based on the force in accordance with the snapping force.

To elastically deform the first arm 62 and the second arm 63 and exert pressing force from the pressing part 61 to the auxiliary heat transfer member 50, the pressing member 60 moves relative to the housing 70 in a direction in which the pressing force is exerted and a direction opposite thereto. Thus, the pressing member 60 includes a guided part 64 as a protrusion that is guided by a guiding part 73$d$ as a cutout of the housing 70 at the relative movement (FIGS. 2 and 3). In this example, two pairs of the guided part 64 and the guiding part 73$d$ are provided.

The pressing member 60 may hold the main heat transfer member 40 so that the electrical connection part $20c_1$ and the auxiliary heat transfer member 50 are fixed in the main heat transfer member 40. For example, in the pressing member 60, a click-shaped protrusion part (not illustrated) that is smaller than a through-hole 42$b$ (FIG. 6) provided through a wall part of the tubular part 42 is inserted into the through-hole 42$b$ to hold the main heat transfer member 40 in a state in which the main heat transfer member 40 can be relatively moved in the direction in which the pressing force is exerted and the direction opposite thereto. In this example, two pairs of the protrusion part and the through-hole 42$b$ are provided.

Specifically, the pressing part 61 is shaped in a rectangular column shape, and one plane thereof in an axis line direction contacts the auxiliary heat transfer member 50. The two guided parts 64 are provided in a protrusion state on the other plane of the pressing part 61 in the axis line direction.

In addition, the above-described protrusion parts corresponding to the through-holes 42$b$ are provided on a sidewall of the pressing part 61.

The first arm 62 and the second arm 63 are shaped in the same shape and provided in a protrusion state on the other plane of the pressing part 61 with the two guided parts 64 interposed therebetween. The first arm 62 and the second arm 63 are each shaped in an S shape including first to third plate parts 66$a$, 66$b$, and 66$c$ that are arranged in a direction orthogonal to the direction in which the pressing force is exerted and the direction opposite thereto and that are oppositely disposed at intervals between adjacent wall surfaces (FIG. 5). The first arm 62 and the second arm 63 each have a fixed end provided at the first plate part 66$a$ that is disposed closest to the two guided parts 64, and a free end provided at the third plate part 66$c$ that is positioned outside and most separated from the first plate part 66$a$.

The pressing member 60 can move relative to the main heat transfer member 40 as described above, and thus can exert, to the auxiliary heat transfer member 50 and the electrical connection part $20c_1$, the above-described pressing force from the pressing part 61 due to elastic deformation of the first arm 62 and the second arm 63 and can sandwich the auxiliary heat transfer member 50 and the electrical connection part $20c_1$ between the heat transfer part 41 and the pressing part 61 while the heat transfer part 41 of the main heat transfer member 40 is in contact with the outer wall surface BC1$b$ of the housing BC1$a$ of the battery cell BC. Accordingly, the pressing member 60 can transfer the pressing force from the pressing part 61 to the heat transfer part 41 through the auxiliary heat transfer member 50 and the electrical connection part 20$c$ and press the heat transfer part 41 to the outer wall surface BC1$b$ of the housing BC1$a$ of the battery cell BC. Thus, the pressing member 60 together with the main heat transfer member 40 can press the auxiliary heat transfer member 50, the thermistor 30 in the auxiliary heat transfer member 50, the electrical connection part $20c_1$, and the heat transfer part 41 of the main heat transfer member 40 toward the outer wall surface BC1$b$ of the housing BC1$a$ of the battery cell BC, which enables heat transfer through the first to third heat transfer paths described above.

The conductive module 1 includes the housing 70 that houses or/and holds at least the terminal connection components 10 and the conductive component 20 (FIGS. 1 to 6). The housing 70 houses or/and holds the pressing member 60 as well. The housing 70 is formed of an insulating material such as synthesis resin.

The housing 70 includes a path guiding part 70$a$ that guide a coupling part $20c_2$ bifurcated from the main body 20$a$ to the corresponding electrical connection part $20c_1$ without causing the coupling part $20c_2$ to interfere with any other component that is not a component of the conductive module on the outer wall surface BC1$b$ side of the housing BC1$a$ of the corresponding battery cell BC (FIGS. 2 to 6). The other component is a component that does not exist as a component of the conductive module 1 and is disposed around the coupling part $20c_2$ on the outer wall surface BC1$b$ side of the coupling part $20c_2$. The other component is, for example, a separator disposed between two adjacent battery cells BC and protruding on the outer wall surface BC1$b$ side of the housing BC1$a$.

For example, the path guiding part 70$a$ is a cutout part provided to the housing 70. The path guiding part 70$a$ as a cutout part is shaped by cutting out, for example, part of a wall of the housing 70 existing on a routing path of the coupling part $20c_2$ when the main body 20$a$ and the electrical connection part $20c_1$ are coupled to each other through the coupling part $20c_2$ without causing the coupling Part $20c_2$ to interfere with the above-described other component.

The housing 70 includes a path regulation part 70b that prevents a coupling part $20c_2$ from drooping on the outer wall surface BC1b side of the housing BC1a of the corresponding battery cell BC (FIGS. 2 to 6). For example, the path regulation part 70b is a lock part that locks the coupling part $20c_2$ to prevent drooping of the coupling part. $20c_2$. The path regulation part 70b as the lock part is shaped, in the housing 70, as a component that locks the coupling part $20c_2$ without causing the coupling part $20c_2$ to interfere with the above-described other component when the coupling part $20c_2$ potentially droops on the outer wall surface BC1b side of the housing BC1a due to its own weight, vibration at vehicle traveling, or the like and the other component exists where the coupling part $20c_2$ droops.

The housing 70 also includes a first lock part 70c that locks the free end of a first arm 62, and a second lock part 70d that locks the free end of the corresponding second arm 63 (FIGS. 2 to 6). The first lock part 70c and the second lock part 70d are shaped as parts that elastically deform the first arm 62 and the second arm 63, the respective free ends of which are locked, while the pressing part 61 of the corresponding pressing member 60 is in contact with the corresponding auxiliary heat transfer member 50, exert force in accordance with snapping force due to the elastic deformation from the respective fixed ends of the first arm 62 and the second arm 63 to the pressing part 61, and exert pressing force toward the corresponding electrical connection part $20c_1$ from the pressing part 61 to the auxiliary heat transfer member 50 based on the force in accordance with the snapping force.

For example, the housing 70 includes a housing member that houses and holds a terminal connection component 10 through an opening, and a cover member that covers the terminal connection component 10 by blocking the opening of the housing member and also covers the conductive component 20 and a peripheral component (such as the pressing member 60) of the corresponding thermistor 30 (not illustrated). Although not illustrated, the housing member includes a holding body for holding the conductive component 20. The housing member also includes a sensor housing body 73 that houses and holds the pressing member 60 (FIGS. 1 to 6).

The sensor housing body 73 is shaped in a tubular shape and houses the pressing member 60 in a state in which part of the pressing part 61 on the auxiliary heat transfer member 50 side protrudes in the inner space of the sensor housing body 73. The sensor housing body 73 also houses the main heat transfer member 40 together with the pressing member 60 in a state in which part of the tubular part 42 on the heat transfer part 41 side protrudes. Accordingly, the thermistor 30, the electrical connection part $20c_1$, and the auxiliary heat transfer member 50 are disposed outside the sensor housing body 73. The thermistor 30, the electrical connection part $20c_1$, and the auxiliary heat transfer member 50 are held by the sensor housing body 73 through the main heat transfer member 40 and the pressing member 60.

The sensor housing body 73 includes a main housing unit 73a that houses a side of the pressing part 61 on which the first arm 62 and the second arm 63 are disposed, the fixed end sides of the first arm 62 and the second arm 63, the guided part 64, and a side of the tubular part 42 opposite to the heat transfer part 41 side (FIGS. 2 to 6). The sensor housing body 73 also includes a first arm housing unit 73b bulging from the main housing unit 73a and housing the free end side of the first arm 62, and a second arm housing unit 73c bulging from the main housing unit 73a and housing the free end side of the second arm 63 (FIGS. 2 to 6).

In the sensor housing body 73, the pressing member 60 relatively moves in the tube axial direction in the inner space. Thus, the guiding part 73d that guides the guided part 64 of the pressing member 60 is shaped at the main housing unit 73a of the sensor housing body 73 (FIGS. 2, 3, and 5).

In the sensor housing body 73, the first lock part 70c is provided at the first arm housing unit 73b, and the second lock part 70d is provided at the second arm housing unit 73c (FIGS. 2, 3, 5, and 6). For example, the first lock part 70c is shaped as a click part protruding in the inner space of the first arm housing unit 73b. The second lock part 70d is shaped as a click part protruding in the inner space of the second arm housing unit 73c.

In addition, in the sensor housing body 73, the path guiding part 70a and the path regulation part 70b are shaped at the main housing unit 73a (FIGS. 2 to 6). In the main housing unit 73a, when the coupling part $20c_2$ extends through the first arm housing unit 73b side, the path guiding part 70a is shaped as a cutout part through a wall on the first arm housing unit. 73b side, and a peripheral part of the wall on the outer wall surface BC1b side of the path guiding part 70a is used as the path regulation part 70b. Alternatively, in the main housing unit 73a, when the coupling part $20c_2$ extends through the second arm housing unit 73c side, the path guiding part 70a is shaped as a cutout part through a wall on the second arm housing unit 73c side, and a peripheral part of the wall on the outer wall surface BC1b side of the path guiding part 70a is used as the path regulation part 70b. Alternatively, in the main housing unit 73a, when the coupling part $20c_2$ extends through the guiding part 73d side, the path guiding part 70a is shaped as a cutout part or a through-hole part through a wall at which the guiding part 73d is shaped, and a peripheral part of the wall on the outer wall surface BC1b side of the path guiding part 70a is used as the path regulation part 70b.

In this example, the coupling part $20c_2$ is routed between the second arm 63 and the outer wall surface BC1b of the housing BC1a of the battery cell BC (FIG. 2). Accordingly, in the main housing unit 73a, the path guiding part 70a is shaped as a cutout part through a wall on the second arm housing unit 73c side, and a peripheral part of the wall on the outer wall surface BC1b side of the path guiding part 70a is used as the path regulation part 70b (FIGS. 2 to 6). The second lock part 70d is provided, to open the inner space of the main housing unit 73a to the outside through the path guiding part 70a so as not to block the path guiding part 70a, on each of one side and the other side with the path guiding part 70a as the cutout part sandwiched therebetween (FIGS. 2 to 4 and 6). Thus, the conductive module 1 can elastically deform both of the first arm 62 and the second arm 63 in accordance with locking by the first lock part 70c and the second lock parts 70d while maintaining the path guiding part 70a of the coupling part $20c_2$.

When the coupling part $20c_2$ is routed between the first arm 62 and the outer wall surface BC1b of the housing BC1a of the battery cell BC, the path guiding part 70a is shaped as a cutout part through a wall on the first arm housing unit 73b side, and a peripheral part of the wall on the outer wall surface BC1b side of the path guiding part 70a is used as the path regulation part 70b Thus, the first lock part 70c is provided, to open the inner space of the main housing unit 73a to the outside through the path guiding part 70a so as not to block the path guiding part. 70a but, on each of one side and the other side with the path guiding part 70a as the cutout part sandwiched therebetween (not illustrated) Accordingly, in this case, the first lock parts 70c are provided as separate two components like the second lock parts 70d in the above-described example. The second lock part 70d is provided in this case as one component like the first lock part 70c in the above-described example.

When the path guiding part 70a is shaped in a wall on which the guiding part 73d is shaped, each of the first lock part 70c and the second lock part 70d can be configured as one component like the first lock part 70c in the above-described example, and thus the first lock part 70c and the second lock part 70d having the same shapes as those of conventional lock parts can be used.

As described above, in the conductive module 1 of the present embodiment, it is possible to prevent interference between the conductive component 20 and the above-described other component around the thermistor 30. Specifically, in the conductive module 1, since the path guiding part 70a is provided at the housing 70, the coupling part $20c_2$ can be routed between the main body 20a and the electrical connection part $20c_1$ without causing the coupling part $20c_2$ interfere with the above-described other component. Accordingly, the conductive module 1 can prevent interference of the coupling part $20c_2$ with the other component at vehicle traveling, generation of friction between the coupling part $20c_2$ and the other component in an interference state, and the like, thereby preventing durability decrease of the coupling part $20c_2$. Thus, the conductive module 1 can maintain conduction performance of the conductive component 20 at high quality, thereby achieving accurate quality management of the battery cells BC for a long time.

In addition, in the conductive module 1 of the present embodiment, the path guiding part 70a is provided at the housing 70, so that the coupling part $20c_2$ can be routed closer to the sensor housing body 73 side, and thus it is possible to prevent the coupling part $20c_2$ from being longer, for example, prevent the coupling part $20c_2$ from detouring when guided to the electrical connection part $20c_1$. Accordingly, the conductive module 1 can increase in the size of the conductive component 20 and simplify arrangement work therefor at assembly, which can prevent cost escalation.

In addition, the conductive module 1 of the present embodiment allows such management of the routing path of the coupling part $20c_2$ and thus can prevent interference of the coupling part $20c_2$ with the above-described other component when the main body 20a is disposed closer to the outer wall surface BC1b side of the housing BC1a of the battery cell BC. Accordingly, the conductive module 1, which allows disposition of the conductive component 20 closer to the outer wall surface BC1b side of the housing BC1a of the battery cell BC, can contribute to reduction in the height of the battery pack BP.

The coupling part $20c_2$ includes, at an end part on the electrical connection part $20c_1$ side, a bent part $20c_{21}$ that is bent in an arc shape to stand up toward a side opposite to the outer wall surface BC1b of the housing BC1a of the battery cell BC (FIGS. 2, 4, 5, and 8). Thus, the first heat transfer member 51 includes, at least at a part facing a bending inner side of the bent part $20c_{21}$, an arc chamfered part 51b that is shaped in an arc shape (FIGS. 5 and 8). The arc chamfered part 51b is a site where an edge of the first heat transfer member 51 at which two orthogonal wall surfaces intersect each other is chamfered in an arc shape. From this viewpoint too, the conductive module 1 of the present embodiment can prevent decrease in durability of the coupling part $20c_2$ and can maintain conduction performance of the conductive component 20 at high quality, thereby achieving quality management of the battery cells BC for a long time. In addition, in the conductive module 1, it is possible to position the bent part $20c_{21}$ close to the first heat transfer member 51 without the need of suppressing relative displacement between the bent part $20c_{21}$ of the coupling part $20c_2$ and the first heat transfer member 51 with a binder or the like. Thus, it is possible to achieve reduction in size and the number of components around the thermistor 30 while preventing durability decrease of the coupling part 2002.

Since the first heat transfer member 51 has a rectangular annular shape in which the length of four side parts is constant, the freedom of disposition of the first heat transfer member 51 when placed on the electrical connection part $20c_1$ is increased by chamfering all edges into an arc shape. For example, any plane of the first heat transfer member 51 may contact the electrical connection part $20c_1$, and any side part may face the bending inner side of the bent part $20c_{21}$.

In a conductive module according to the present embodiment, it is possible to prevent interference of a conductive component around a thermistor with another component that is not a component of the conductive module on an outer wall surface side of a battery cell. Specifically, in the conductive module, a path guiding part is provided at a housing so that a coupling part can be routed between a main body of the conductive component and an electrical connection part without causing the coupling part to interfere with the above-described other component. Accordingly, the conductive module can prevent interference of the coupling part with the other component at vehicle traveling, generation of friction between the coupling part and the other component in an interference state, and the like, thereby preventing decrease in the durability of the coupling part. Thus, the conductive module according to the present embodiment can maintain conduction performance of the conductive component at high quality, thereby achieving accurate quality management of the battery cell for a long time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conductive module comprising:
   a conductive component that includes a flat laminated body of a plurality of flexible electric conductors and a flexible electric insulator and electrically connects the electric conductors to a plurality of battery cells arranged in an array direction;
   a thermistor that is provided for a temperature detection target among all battery cells in a state where the thermistor is placed on an electrical connection part of a bifurcated body that is bifurcated from a main body of the conductive component, and is configured to detect the temperature of a battery cell as the temperature detection target;
   a housing that houses or/and holds the conductive component;
   a heat transfer member configured to transfer heat of the electrical connection part to the thermistor; and
   a pressing member separable from the housing and configured to press the electrical connection part, wherein
   the conductive component is a flexible printed circuit substrate,
   the bifurcated body is a part including the flexible electric insulator, the electrical connection part housing at least one of the plurality of flexible electric conductors for the thermistor, and a coupling part that couples the electrical connection part to the main body, the bifurcated body being bifurcated from the main body separately from any electrical connection member that extends from the main body and is configured to be coupled to electrical connection terminals of the battery cells, the electrical connection part is a part that connects the thermistor physically and electrically to the at least one of the plurality of flexible electric conductors for the thermistor and allows heat of an outer wall surface of the battery cell to be directly or indirectly transferred from a surface on a side opposite to a placement surface on which the thermistor is placed to the electrical connection part, the housing includes a path guiding part that guides the coupling part, bifurcated from the main body, to the electrical connection part without causing the coupling part to interfere with another component that is different from a component of the conductive module on the outer wall surface side, the path guiding part is a cutout part provided to the housing, the heat transfer member is provided on and in contact with the placement surface side of the electrical connection part to transfer the heat of the electrical connection part to the thermistor, and the pressing member being configured to press the electrical connection part toward the outer wall surface through the heat transfer member, wherein the electrical connection part is pressed against and in contact with the heat transfer member.

2. The conductive module according to claim 1, wherein:
the pressing member includes:
  a pressing part that exerts pressing force toward the electrical connection part to the heat transfer member, and
  a first arm and a second arm that are each a cantilever protruded in arm shapes from the pressing part, the first arm and the second arm being elastically deformable,
the housing includes a first lock part that locks a free end of the first arm, and a second lock part that locks a free end of the second arm,
the first lock part and the second lock part are shaped as parts that elastically deform the first arm and the second arm each having an free end that is locked, while the pressing part is in contact with the heat transfer member, exert force in accordance with snapping force due to the elastic deformation from the respective fixed ends of the first arm and the second arm to the pressing part, and exert the pressing force from the pressing part to the heat transfer member based on force in accordance with the snapping force,
the coupling part is routed between the second arm and the outer wall surface, and
the second lock part is provided on each of one side and the other side with the path guiding part as the cutout part sandwiched therebetween.

3. The conductive module according to claim 2, wherein the heat transfer member includes:
  a first heat transfer member that is formed in an annular shape, is placed on the electrical connection part, disposes the thermistor in an internal space inside of the annular shape, and is physically connected to the electrical connection part, and
  a second heat transfer member that fills the internal space and transfers heat of the first heat transfer member and the electrical connection part to the thermistor,
the coupling part includes, at an end part on the electrical connection part side, a bent part that is bent in an arc shape to stand up toward a side opposite to the outer wall surface, and
the first heat transfer member includes, at least at a part facing a bending inner side of the bent part, an arc chamfered part that is shaped in an arc shape.

* * * * *